United States Patent
Hu et al.

(10) Patent No.: US 9,923,853 B2
(45) Date of Patent: Mar. 20, 2018

(54) FOLDERS THAT EMPLOY DYNAMIC USER TRAINING RULES TO ORGANIZE CONTENT

(71) Applicant: Quest Software Inc., Aliso Viejo, CA (US)

(72) Inventors: Guangning Hu, Kanata (CA); Xuejun Situ, Ottawa (CA)

(73) Assignee: Quest Software Inc., Aliso Viejo, CA (US)

( * ) Notice: Subject to any disclaimer, the term of this patent is extended or adjusted under 35 U.S.C. 154(b) by 304 days.

(21) Appl. No.: 14/874,587

(22) Filed: Oct. 5, 2015

(65) Prior Publication Data

US 2017/0099247 A1     Apr. 6, 2017

(51) Int. Cl.
*G06F 15/16*    (2006.01)
*H04L 12/58*    (2006.01)

(52) U.S. Cl.
CPC .................................. *H04L 51/22* (2013.01)

(58) Field of Classification Search
CPC ......... H04L 51/22; H04L 51/12; H04L 51/26; G06Q 10/107
See application file for complete search history.

(56) References Cited

U.S. PATENT DOCUMENTS

| | | | | |
|---|---|---|---|---|
| 8,903,752 | B1 * | 12/2014 | Pacovsk | G06N 99/005 706/20 |
| 9,699,129 | B1 * | 7/2017 | Nelken | H04L 51/26 |
| 2002/0040370 | A1 * | 4/2002 | Entwistle | G06F 17/30011 |
| 2004/0088359 | A1 * | 5/2004 | Simpson | G06Q 10/107 709/206 |
| 2007/0143420 | A1 * | 6/2007 | Daniell | G06Q 10/107 709/206 |
| 2009/0327168 | A1 * | 12/2009 | Weinberger | H04L 51/12 706/11 |
| 2011/0055196 | A1 * | 3/2011 | Sundelin | G06F 17/30528 707/711 |
| 2011/0307804 | A1 * | 12/2011 | Spierer | G06Q 10/107 715/752 |
| 2012/0143798 | A1 * | 6/2012 | Sundelin | G06Q 10/107 706/12 |
| 2014/0337590 | A1 * | 11/2014 | Lemus | G06F 12/00 711/161 |
| 2016/0142359 | A1 * | 5/2016 | Lock | H04L 51/24 709/206 |
| 2017/0310625 | A1 * | 10/2017 | Hu | H04L 51/22 |

\* cited by examiner

*Primary Examiner* — Shean Tokuta
(74) *Attorney, Agent, or Firm* — Kirton McConkie; Brian Tucker

(57) ABSTRACT

Dynamic user training rules can be employed to organize content within a folder. Each folder can be associated with a dynamic rule that defines a number of attribute and weighting factor associations and a folder threshold. Each attribute and weighting factor association can identify an attribute that is common among the contents of the smart folder and associate a weighting factor with the common attribute. Whenever a user manually moves content into or out of the smart folder, the attribute and weighting factor associations and possibly the folder threshold can be updated accordingly, such as by adjusting a value of one or more weighting factors to better reflect how common they are after the content has been manually moved into or out of the folder. In this way, the dynamic rule is automatically updated in response to the user's interaction with the smart folder.

19 Claims, 9 Drawing Sheets

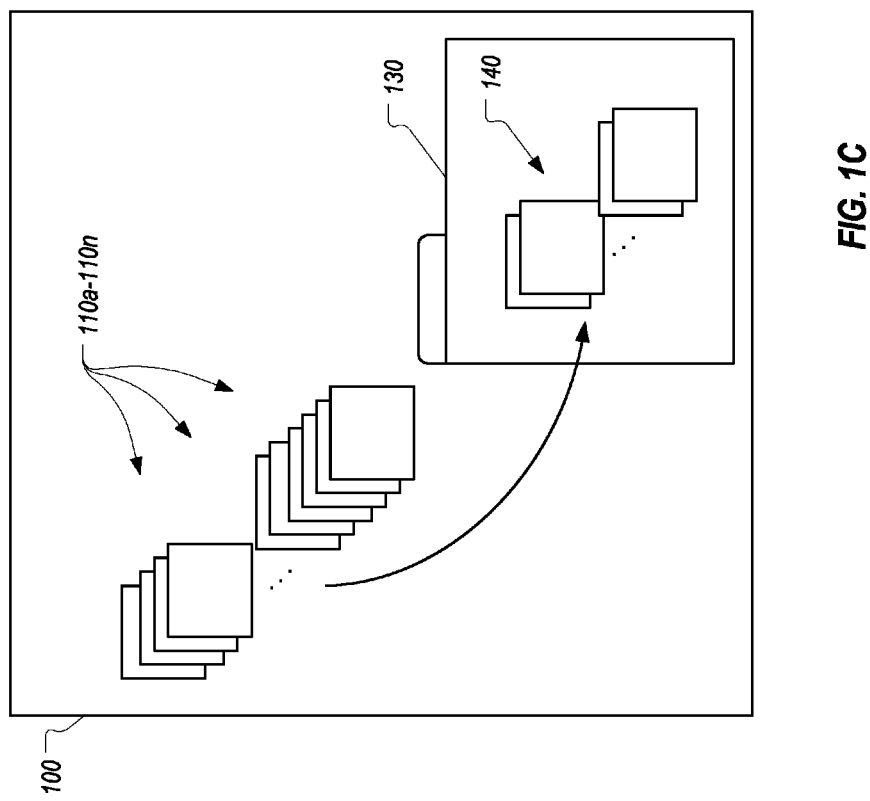

600

601
Maintain A Folder That Stores A Number Of Emails, The Folder Being Associated With A Dynamic Rule That Is Employed To Determine Whether An Email Should Be Automatically Added To The Folder, The Dynamic Rule Including A Number Of Associations And A Folder Threshold, Each Association Identifying An Attribute And A Weighting Factor Associated With The Attribute

602
Receive User Input That Manually Adds A First Email To The Folder, And In Response, Updating The Dynamic Rule By Increasing The Weighting Factor Associated With Any Attribute That The First Email Matches And Decreasing The Weighting Factor Associated With Any Attribute That The First Email Does Not Match

603
Receive User Input That Manually Removes A Second Email From The Folder, And In Response, Updating The Dynamic Rule By Decreasing The Weighting Factor Associated With Any Attribute That The Second Email Matches And Increasing The Weighting Factor Associated With Any Attribute That The Second Email Does Not Match

*FIG. 6*

FOLDERS THAT EMPLOY DYNAMIC USER TRAINING RULES TO ORGANIZE CONTENT

CROSS-REFERENCE TO RELATED APPLICATIONS

N/A

BACKGROUND

A mailbox is used to store a user's messages. The most common example of a mailbox is an email mailbox used to store emails although mailboxes exist for storing other types of messages or even multiple types of messages. For simplicity, the term email will be used hereafter, including in the claims, to represent not only email by any other type of similar electronic message (e.g., SMS messages, collaboration platform messages, etc.) that is stored in a mailbox.

With the proliferation of email, it has become increasingly difficult to organize a mailbox. One common approach to organizing a mailbox is the use of folders to group together emails. For example, most email services include an inbox folder within the mailbox that groups together the user's received emails. Most email providers also provide folders to group together sent emails, drafts, deleted emails, etc. Such folders are typically default folders having unmodifiable rules defining which emails the folders will contain.

Most email providers also provide the ability to create custom folders within a mailbox. These custom folders may or may not be associated with rules. For example, a user may create a custom folder without rules in which case emails would only be stored in the custom folder if the user manually moved the emails into the custom folder. In contrast, a user may create a custom folder and specify rules defining which emails should be stored in the custom folder. In such cases, the rules can be applied to applicable emails (e.g., to all emails in the mailbox or to emails in a particular folder such as the inbox) to automatically determine whether the emails should be moved into the custom folder. These rules can be applied only at a particular time (e.g., only on emails currently stored in a particular folder) or can be applied on an ongoing basis (e.g., whenever an email is received or sent).

The ability to define custom rules for organizing emails into custom folders facilitates organizing a mailbox. However, defining custom rules that properly organize emails is a tedious, problematic, and difficult process. For these reasons, custom rules are oftentimes only employed by advanced users.

BRIEF SUMMARY

The present invention extends to methods, systems, and computer program products for providing smart folders that employ dynamic user training rules to organize content. In particular embodiments, these smart folders can be folders within an email mailbox although the present invention can be employed to organize any type of content within any type of folder. "Dynamic user training" refers to the fact that the rules are dynamically adjusted based on a user's interaction with the smart folder.

Each smart folder can be associated with a dynamic rule that defines a number of attribute and weighting factor associations and a folder threshold. Each attribute and weighting factor association can identify an attribute that is common among the contents of the smart folder and associate a weighting factor with the common attribute. These attribute and weighting factor associations constitute a weighted composite index that can be used to generate an index for any particular content. The indexes of content stored within the smart folder can be used to generate the folder threshold. An index generated for content not stored in the smart folder can be compared to the folder threshold to determine whether the content should be stored in the smart folder.

Whenever a user manually moves content into or out of the smart folder, the attribute and weighting factor associations and possibly the folder threshold will be updated accordingly, such as by adjusting a value of one or more weighting factors to better reflect how common they are after the content has been manually moved into or out of the folder. In this way, the dynamic rule is automatically updated in response to the user's interaction with the smart folder. The updated dynamic rule can then be employed to determine whether content should automatically be stored in the smart folder. Accordingly, by manually moving content into and out of the smart folder, the user can train the system to better identify exactly what type of content should be stored in the folder.

In one embodiment, the present invention is implemented as a method for providing a dynamic rule that is used to identify whether an email should be stored in a folder. A folder that stores a number of emails is accessed. Attributes of each of the number of emails are analyzed to identify one or more common attributes. For each common attribute, a weighting factor is associated with the common attribute. The weighting factor represents how common the common attribute is among the number of emails in the folder. Each weighting factor is employed to determine whether an email should automatically be stored in the folder. In response to a user manually adding an email to or removing an email from the folder, the weighting factor associated with at least one of the one or more common attributes is automatically adjusted.

In another embodiment, the present invention is implemented as a method for automatically adjusting a dynamic rule in response to a user manually adding an email to a folder or manually removing an email from the folder. A folder that stores a number of emails is maintained. The folder is associated with a dynamic rule that is employed to determine whether an email should be automatically added to the folder. The dynamic rule includes a number of associations and a folder threshold. Each association identifies an attribute and a weighting factor associated with the attribute. User input that manually adds a first email to the folder is received. In response, the dynamic rule is updated by increasing the weighting factor associated with any attribute that the first email matches and decreasing the weighting factor associated with any attribute that the first email does not match. User input that manually removes a second email from the folder is also received. In response, the dynamic rule is updated by decreasing the weighting factor associated with any attribute that the second email matches and increasing the weighting factor associated with any attribute that the second email does not match.

In another embodiment, the present invention is implemented as a method for creating and updating a dynamic rule for a folder. A folder that stores a number of documents is accessed. Attributes of each of the number of documents are analyzed to identify one or more common attributes. For each common attribute, a weighting factor is associated with the common attribute. The weighting factor represents how common the common attribute is among the number of documents in the folder. Each weighting factor is employed to determine whether a document should automatically be stored in the folder. User input that manually adds a first document to the folder is received. In response, the dynamic rule is updated by increasing the weighting factor associated with any attribute that the first document matches and decreasing the weighting factor associated with any attribute that the first document does not match. User input that manually removes a second document from the folder is also received. In response, the dynamic rule is updated by decreasing the weighting factor associated with any attribute that the second document matches and increasing the weighting factor associated with any attribute that the second document does not match.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 1A-1D illustrate an example of how a dynamic rule can be created for a folder within a mailbox or other storage structure;

FIG. 6 illustrates a flowchart of an example method for automatically adjusting a dynamic rule in response to a user manually adding an email to a folder or manually removing an email from the folder.

DETAILED DESCRIPTION

The following description will employ an example where a dynamic rule is associated with a smart folder in an email mailbox. However, the processes described for creating and updating the dynamic rule can be employed in other contexts such as for organizing documents of any type within a file system folder.

Figure 1A:
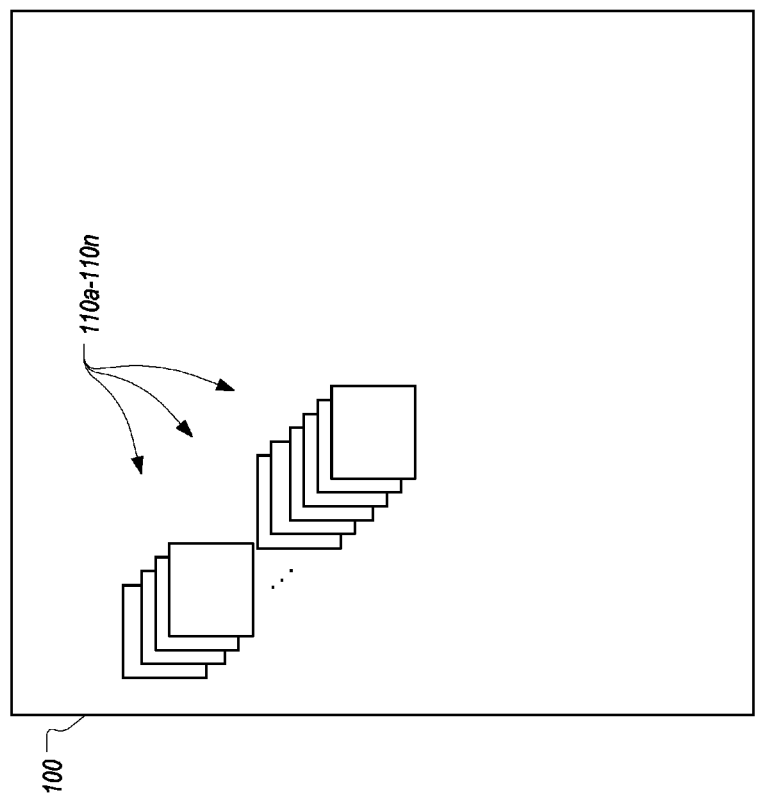
Figure 1B:
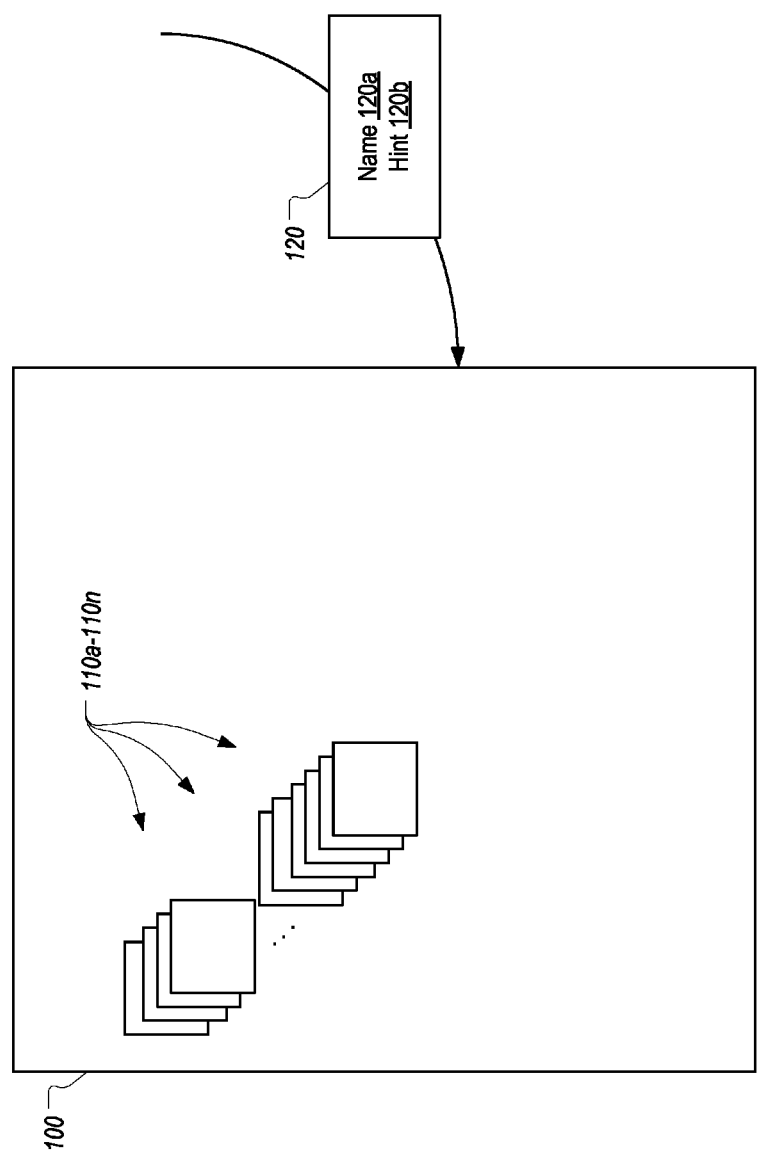

FIGS. 1A-1D illustrate an example of how a smart folder can be created in accordance with one or more embodiments of the present invention. FIG. 1A depicts a mailbox 100 that contains a number of emails 110*a*-110*n*. Alternatively, mailbox 100 could be a folder of a mailbox such as the inbox folder. In any case, mailbox 100 represents the logical storage structure used to store emails to which a dynamic rule of a smart folder can be applied to determine whether the email should be stored within the smart folder. As noted above, the term "email" should be construed broadly to encompass any type of electronic communication that is directed to an end-user.

In FIG. 1A, it is assumed that a smart folder has not yet been created. Then, in FIG. 1B, a request 120 to create a smart folder is received. Request 120 can specify a name 120*a* for the smart folder as well as a hint 120*b* that will be used to initially identify a number of emails 110*a*-110*n* that should be grouped into the smart folder. In this sense, hint 120*b* can be viewed as being similar to a custom rule used by folders in the prior art. For example, hint 120*b* could specify that any email having a particular phrase in the subject should be grouped into the smart folder.

FIG. 1C illustrates that a smart folder 130 has been created based on request 120. The creation of smart folder 130 includes a step of processing emails 110*a*-110*n* to identify which of these emails matches rule 120*b*. For example, in FIG. 1C, a subset 140 of emails 110*a*-110*n* are shown as being stored within smart folder 130 indicating that the emails in this subset matched hint 120*b*.

It is noted that how emails are actually "stored" in a particular folder is not important to the invention. For example, the emails included in subset 140 may not actually be stored in or moved to a different location when they are included in smart folder 130. Instead, the inclusion of a particular email in a smart folder (or any folder for that matter) can be accomplished by associating an identifier with the email or in any other manner known in the art. Of importance to the invention is the fact that some technique is employed to associate a number of emails with a particular smart folder so that these emails can be displayed to the user as being contained within the smart folder. In the remainder of the specification, the concept of associating an email with a particular smart folder will be referred to as storing the email in the smart folder.

Once hint 120*b* has been employed to store subset 140 of emails 110*a*-110*n* in smart folder 130, each email in subset 140 can be analyzed to identify its attributes. An attribute should be construed broadly as encompassing any identifiable characteristic of an email. Examples of attributes include:

sender/recipient attributes such as an email address of the sender, an email address of other recipients, characteristics of the sender or other recipients (e.g., name, department, office, street address, phone number, manager, who the sender or recipient reports to, out of office status, free/busy information, distribution group membership), historical information about the sender or recipients (e.g., a number of messages exchanged with the sender/recipient, a last time that a message was exchanged with the sender/recipient, a percentage of times that the user replied to the sender/recipient, an amount of time it took the user to respond, etc.), or how the user was addressed (e.g., within the to, cc, or bcc field, as part of a distribution group, etc.);

categorizing attributes (or tags) such as whether the email was flagged for follow up, was marked as sensitive, was encrypted, or was otherwise categorized by the sender;

content attributes such as words or phrases in the subject or body of the email, a number or size of attachments the email includes, or a file name or file type of an attachment;

type attributes such as whether the email is a reply, a forward, a non-delivery report, an auto reply, a read receipt, an appointment, a meeting request, a delivery report, a journaling message, a quota notification, or other system generated message;

timing attributes such as when the email was sent or received, or, if the email is reply or forward, when the original message was sent;

header attributes; and email thread attributes.

It is noted that some attributes cannot be directly identified from the email itself but require accessing external content. For example, some of the sender/recipient attributes may be identified by accessing other emails (e.g., to identify historical information) or by accessing a user directory service such as Microsoft's Active Directory (e.g., to identify characteristics of the sender or other recipients).

Once the attributes of each email in subset 140 have been identified, the system can identify which attributes commonly appear in subset 140. An attribute can be identified as being common if at least some of the emails in subset 140 match the attribute. A weighting factor can then be generated for such common attributes to produce attribute and weighting factor associations (or simply "associations"). These associations generally comprise a rule for identifying a particular attribute and an associated weighting factor. This weighting factor generally defines how much weight should be given to an attribute, for purposes of categorizing an email within a smart folder, when the attribute is present within an email. The value of a weighting factor for a particular attribute is therefore based on how common the attribute is within the emails of subset 140. For example, if all emails within subset 140 have a common sender, a corresponding weighting factor can be assigned a value of 1, whereas, if only half of the emails within subset 140 have a common sender, the corresponding weighting factor can be assigned a weighting factor of 0.5. On the other hand, if the analysis revealed that no common sender or senders appear in the emails of subset 140, an association for this attribute may not be created (or if created, may be assigned a weighting factor of 0).

Once attribute and weighting factor associations have been created, the associations can be combined into a weighted composite index. For example, in FIG. 1D, a weighted composite index 151 is shown as having been created for smart folder 130 which includes attribute and weighting factor associations 152. Once created, weighted composite index 151 can be employed to generate an email index for any email. The process of generating an email index will be described in detail below with reference to FIG. 2. As an overview, an email index is a value that represents how closely the email matches a smart folder.

The email index of all emails within a smart folder can be employed to generate a folder threshold. Generally, all emails stored in a smart folder should have an email index that is greater than the folder threshold for the smart folder while emails not stored in the smart folder should have an email index that is less than the folder threshold. This is a general rule since there may be cases where a particular email may have email indexes that exceed the folder threshold for multiple smart folders (i.e., the email may properly be stored in more than one smart folder).

Figure 1D:
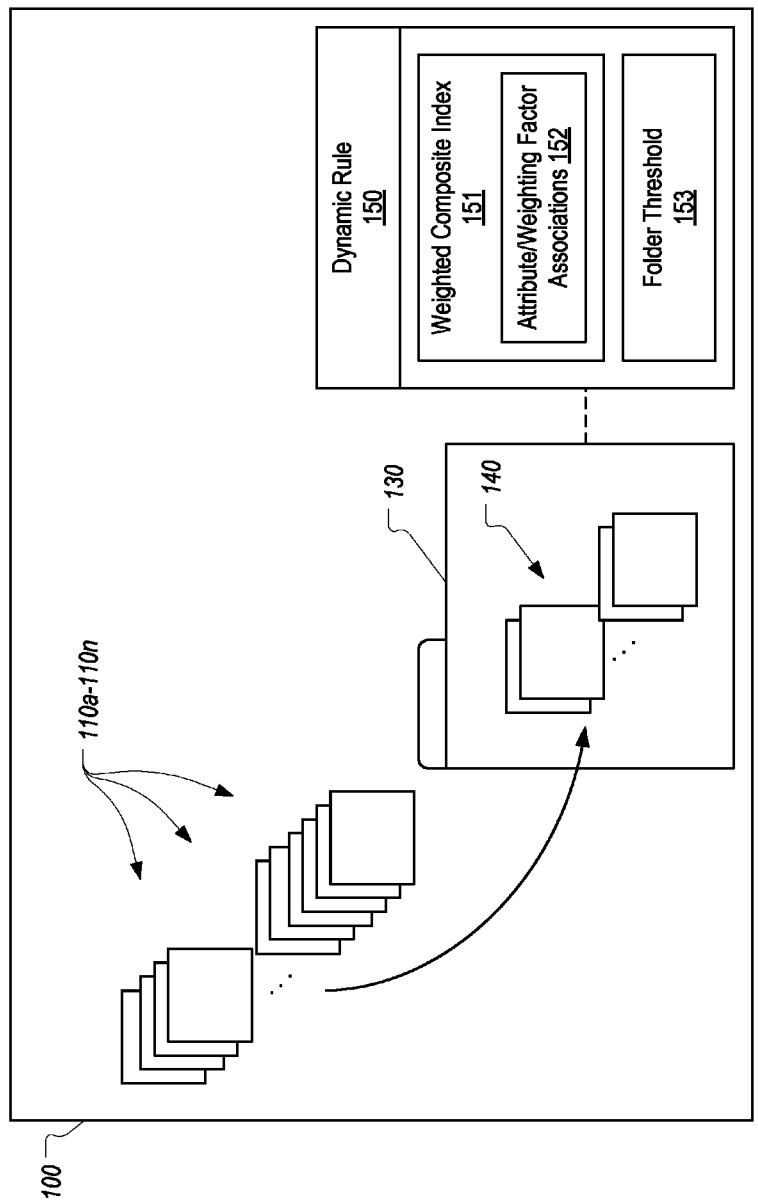

The result of this processing is the generation of a dynamic rule for the smart folder. For example, as shown in FIG. 1D, a dynamic rule 150 has been created for smart folder 130. Dynamic rule 150 includes weighted composite index 151 and folder threshold 153. It is noted that each smart folder that is created will have a unique dynamic rule. In other words, the weighted composite index and folder threshold are specific to a particular smart folder.

Dynamic rule 150 can be employed to determine whether any email (e.g., newly received emails) should be stored in smart folder 130. This determination can be accomplished by comparing the email's attributes to weighted composite index 151 to generate an email index. The email index can then be compared to the folder threshold to determine whether the email should be stored in smart folder 130.

Figure 2:
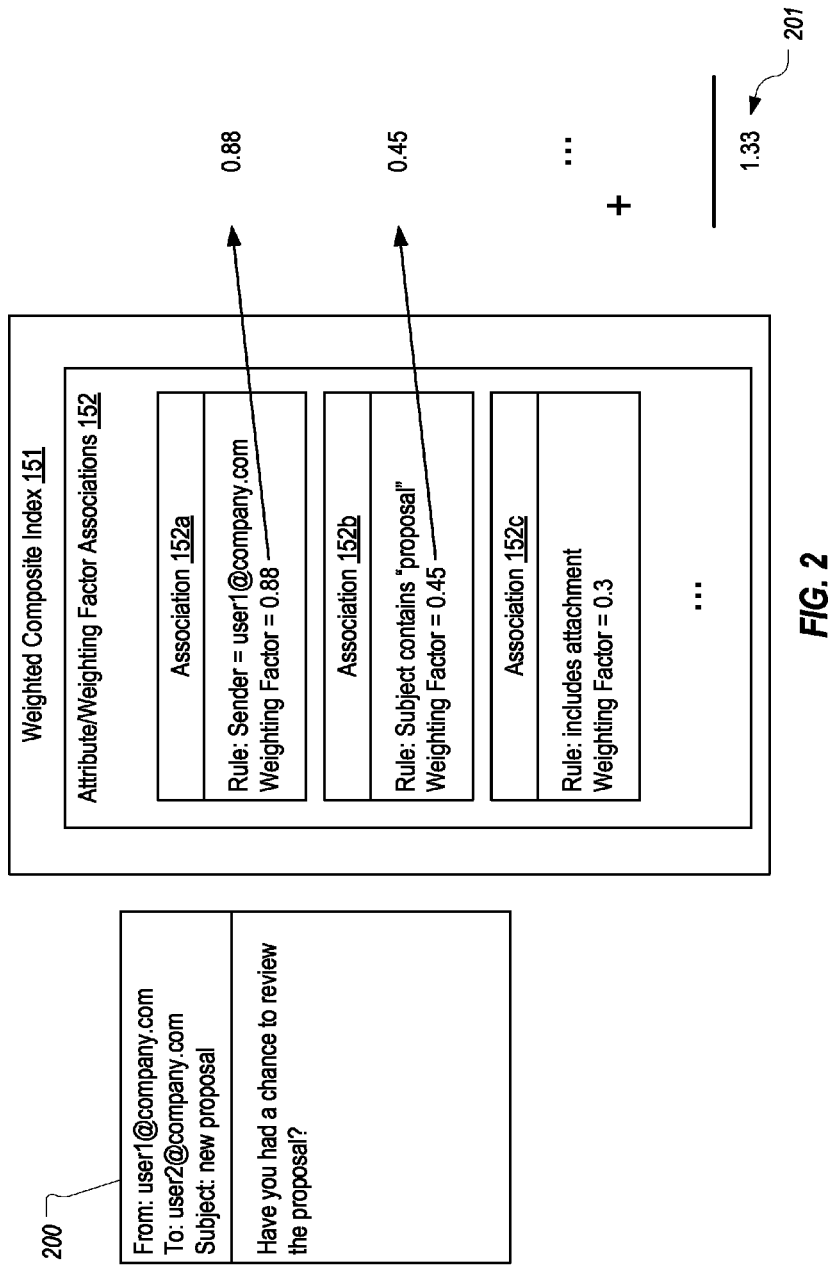
FIG. 2 illustrates an example of how an index can be generated for an email or other content based on a weighted composite index of a dynamic rule.

FIG. 2 illustrates an example of how weighted composite index 151 can be employed to generate an email index 201 for an email 200. In this example, only three associations 152*a*-152*c* are shown as being considered in the calculation of email index 201. However, as represented by the ellipsis, any number of associations can be employed. Also, in this example, it is assumed that the value of a weighting factor can be between 0 and 1. However, any range of values could be employed.

Association 152*a* includes a rule related to a sender attribute. In particular, if an email was sent by user1@company.com, the weighting factor defined in association 152*a* will be included in the calculation of an email index for that email. Similarly, association 152*b* includes a rule and associated weighting factor which define that a weighting factor of 0.45 should be included when the subject of an email contains "proposal." Also, association 152*c* defines that a weighting factor of 0.3 should be included when an email includes an attachment.

As shown in FIG. 2, email 200 was sent by user1@company.com and includes proposal in its subject. Email 200 therefore includes the attributes identified by associations 152*a* and 152*b*. As such, the corresponding weighting factors of 0.88 and 0.45 should be considered in the calculation of email index 201. In contrast, email 200 does not include an attachment, and therefore, the weighting factor of association 152*c*, which is 0.3, should not be considered. Email index 201 can then be generated by combining the applicable weighting factors. For example, as shown on the right side of FIG. 2, email index 201 is generated by summing the applicable weighting factors which in this case yields a value of 1.33 (assuming no other weighting factors are applicable). Summing is only one example of how applicable weighting factors can be combined to produce an email index. Other equations or formulas could equally be used.

This process of generating an email index for a particular email can therefore be summarized as identifying which of the smart folder's common attributes are present in the particular email and then combining the weighting factors of any common attributes that are present. In the case where weighting factors are summed to yield the email index, the higher the email index is the more similar the email should be to the emails currently stored in the smart folder.

Accordingly, once email index 201 has been generated for email 200, email index 201 can be compared to folder threshold 153. If email index 201 exceeds folder threshold 153 (which would indicate that email 201 is very similar to the emails currently stored in smart folder 130), email 200 can be stored in smart folder 130. In this manner, any email can be analyzed to determine whether it should be stored within smart folder 130.

To summarize, a smart folder can initially be populated based on a hint. Then, after some emails have been stored in the smart folder, a weighted composite index can be generated for the smart folder based on attributes that are determined to be common in the emails that are stored in the smart folder. The application of this weighted composite index to the emails stored in the folder (and possibly to emails stored outside the folder) can generate the folder threshold. The combination of the weighted composite index and the folder threshold constitute the dynamic rule for the smart folder.

The structure of a dynamic rule allows the rule to be easily adjusted based on user input. More particularly, when a user manually moves an email into or out of smart folder 130, associations 152 can be adjusted to better reflect which attributes are most important for identifying whether an email should be stored in smart folder 130. When such adjustments are made within weighted composite index 151, folder threshold 153 can also be updated to ensure that it identifies an appropriate threshold.

Figure 3:
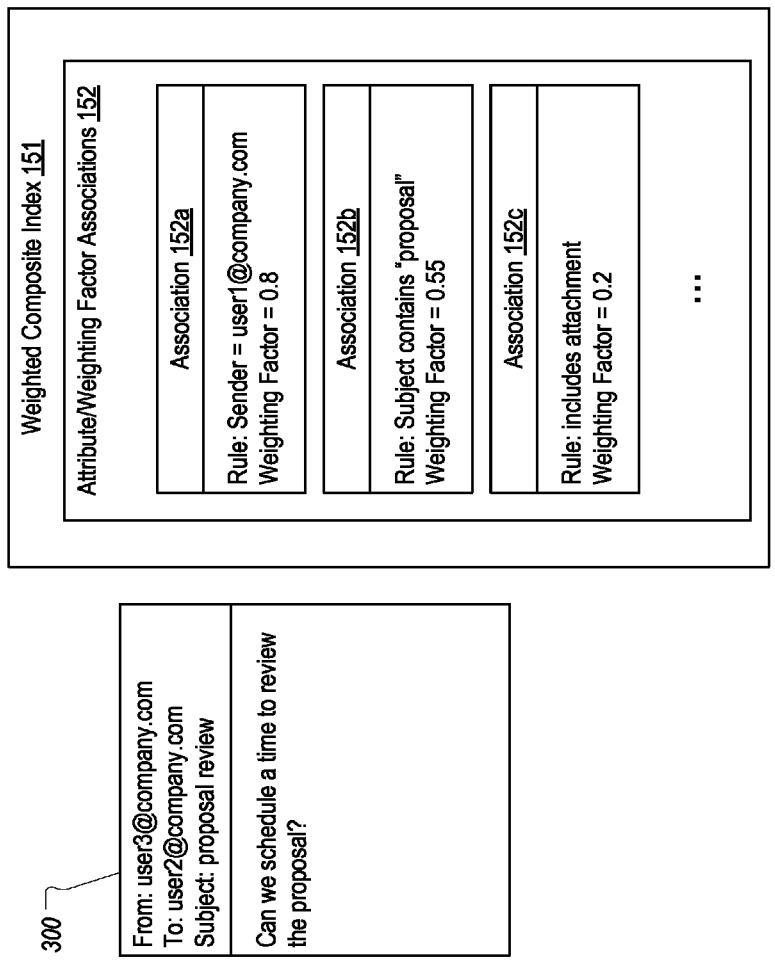
FIG. 3 illustrates an example of how a dynamic rule can be automatically updated in response to a user manually adding content to a folder to which the dynamic rule applies.

FIG. 3 illustrates an example of how dynamic rule 150 can be updated when an email 300 is manually added to smart folder 130. In this example, it will be assumed that, immediately prior to email 300 being added to smart folder 130, associations 152 had the values shown in FIG. 2. As shown, email 300 includes the attributes of being sent by user3@company.com, including proposal in the subject, and not including an attachment. By comparing these attributes of email 300 to associations 152*a*-152*c* (or more particularly, by applying the rules of associations 152*a*-152*c* to email 300), it can be determined which weighting factors should be adjusted. For example, association 152*a* had previously defined a weighting factor having a high value of 0.88 representing that most emails in smart folder 130 were sent by user1@company.com. However, now that email 300, which was not sent by user1@company.com, has been manually added to smart folder 130, the weighting factor within association 152*a* can be reduced. Accordingly, in FIG. 3, the weighting factor in association 152*a* is shown as having been reduced to 0.8. This reduction indicates that the fact that an email may have been sent by user1@company.com should be given a little less weight when determining whether to include the email in smart folder 130.

On the other hand, because email 300 includes proposal in the subject which matches the rule defined in association 152*b*, the corresponding weighting factor can be increased. Accordingly, in FIG. 3, the weighting factor in association 152*b* is shown as having been increased from 0.45 to 0.55. This increase represents that the presence of "proposal" in an email's subject should be weighed a little more heavily when determining whether an email should be stored in smart folder 130.

Further, because email 300 does not include an attachment, the weighting factor in association 152*c* is shown as being reduced from 0.3 to 0.2. This decrease represents that the inclusion of an attachment should be given less weight when determining whether an email should be stored in smart folder 130.

Accordingly, whenever a user manually adds an email to a smart folder, the system can dynamically update one or more associations appropriately. In this way, the weighting factor associated with a particular attribute can accurately reflect how common the particular attribute is among the emails currently stored in the smart folder rather than reflecting how common the particular attribute was when the smart folder was originally created. As will be further described below, whenever associations 152 are dynamically updated, folder threshold 153 may also be dynamically updated based on the updated values of any weighting factors.

Figure 4:
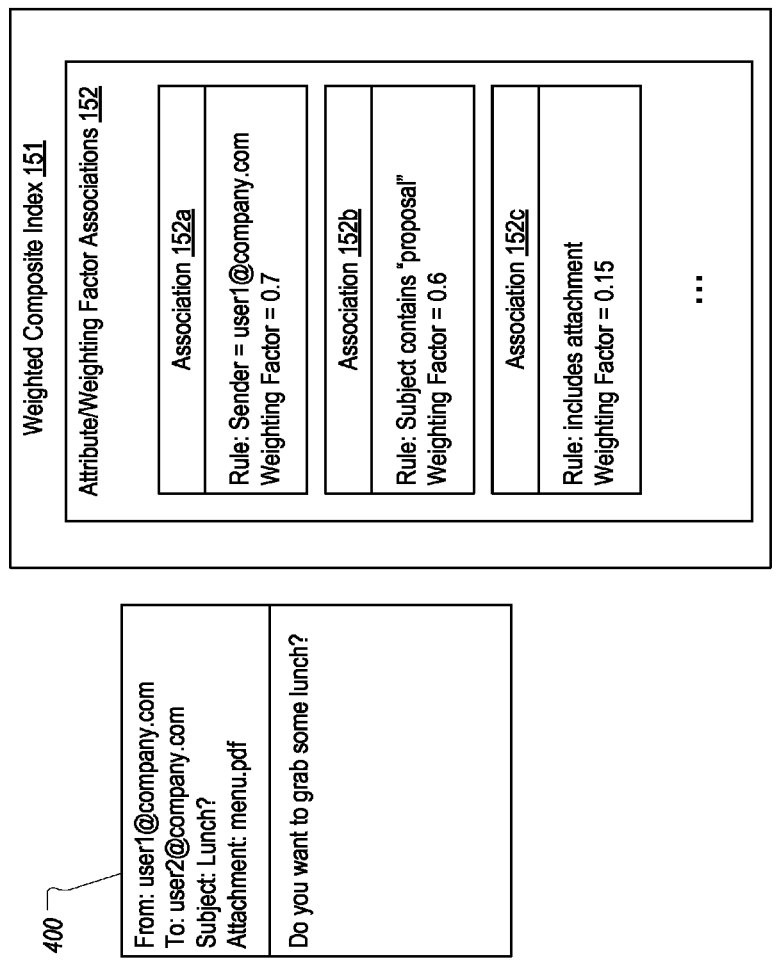
FIG. 4 illustrates an example of how a dynamic rule can be automatically updated in response to a user manually removing content from a folder to which the dynamic rule applies.

A similar process can be performed when a user manually moves an email out of a smart folder. FIG. 4 provides an example of the process of updating associations 152 when the user manually moves an email 400 out of smart folder 130. In this example, it will be assumed that email 400 was automatically stored in smart folder 130 (e.g., upon receipt of email) based on the values of associations 152 shown in FIG. 3 and then manually removed. In other words, the application of weighted composite index 151 to email 400 generated an email index for email 400 that exceeded folder threshold 153 thereby indicating that email 400 should be stored in smart folder 130.

As shown, email 400 was received from user1@company.com, does not include proposal in the subject, and includes an attachment. In response to email 400 being removed, the system can adjust the value of associations 152 accordingly. For example, because email 400 was sent by user1@company.com which matches association 152*a*, the value of the weighting factor of association 152*a* can be reduced. Similarly, because email 400 includes an attachment, which matches the association 152*c*, the value of the weighting factor of association 152*c* can be reduced. These reductions represent that the fact that an email is sent by user1@company.com or includes an attachment should be given less weight when determining whether to store an email in smart folder 130.

On the other hand, because email 400 does not include proposal in its subject, the value of the weighting factor in association 152*b* can be increased. This increase represents that the presence of proposal in the subject of an email should be given greater weight when determining whether to store an email in smart folder.

To summarize, when an email is manually removed from a smart folder, the weighting factor associated with attributes that do not match the removed email's attributes can be increased whereas the weighting factor associated with attributes that match the removed email's attributes can be decreased. Similarly, when an email is manually added to a smart folder, the weighting factor associated with attributes that match the added email's attributes can be increased whereas the weighting factor associated with attributes that do not match the added email's attributes can be decreased.

In addition to modifying associations 152 by changing the value of a weighting factor of a particular association, associations 152 may also be modified by adding or removing a particular association. For example, when an email is manually added to a smart folder, the system may determine that an attribute for which an association has not been created has now become common. In response, an association for that attribute may be created and assigned an appropriate weighting factor. Similarly, when an email is manually removed from a smart folder, the system may determine that an attribute for which an association exists is no longer common. In response, an association for the now uncommon attribute can be removed. Alternatively, the weighting factor of the association could be assigned a 0 value or otherwise made to have no impact on the generation of the folder threshold or an email index.

Whenever associations 152 are updated in response to an email being manually added to or removed from smart folder 130, folder threshold 153 may also be updated based on the new values of weighting factors 152. This can be accomplished by analyzing each email that is stored in smart folder 130 to generate an email index for each email. These email indexes can then be used to set an appropriate value of folder threshold 153. For example, folder threshold 153 can be assigned a value that is less than or equal to the email index of each email stored in smart folder 130 but greater than an email index of each email not stored in smart folder 130.

When a new folder threshold is being generated, if it is determined that the updated associations yield email indexes for emails stored within the smart folder that are lower than email indexes for emails stored outside the smart folder, the associations may be regenerated in a similar manner as the associations were originally generated (i.e., by analyzing the attributes of all emails currently stored within the smart folder). In this manner, it can be ensured that the weighted composite index for the smart folder is based on the current contents of the folder.

Once a dynamic rule has been generated and/or updated, the user can request that the dynamic rule be applied to all emails, whether stored within the smart folder or not, to reorganize the emails. For example, after the user has added a number of emails to a smart folder to identify to the system the type of emails the user would like stored in the smart folder, and the dynamic rule for the smart folder has been updated accordingly, the user may then request that the dynamic rule be applied to all emails to identify any other emails that should also be stored in the smart folder.

In some embodiments, a dynamic rule can be imported or exported. For example, one user may share a dynamic rule with another user. Also, in some embodiments, multiple dynamic rules may be merged together into a single dynamic rule. In such cases, the associations from each dynamic rule can be combined and a new folder threshold can be generated using the combined associations.

The present invention may also be employed to predefine a smart folder and its associated dynamic rule. For example, an organization may desire to provide predefined smart folders to its employees. In such cases, an administrator can create an appropriate dynamic rule (e.g., in any of the manners described above) and deploy a smart folder with the dynamic rule within the employees' mailboxes or other content storage structure. In this way, smart folders can be employed to standardize business processes within the organization.

In conclusion, the present invention provides a way for the user to train a system to understand exactly what kind of attributes to look for when determining if an email should be stored in any particular smart folder. Any time the user manually adds an email to or removes an email from a smart folder, the dynamic rule for that smart folder can be updated accordingly. In this way, the user can easily customize the dynamic rules by simply moving emails into and out of particular smart folders.

Although the above description has been limited to email embodiments, the present invention may also be employed to organize non-email-specific folders. For example, a dynamic rule may be defined for a file system folder to organize a user's documents regardless of the type of the document.

Figure 5:
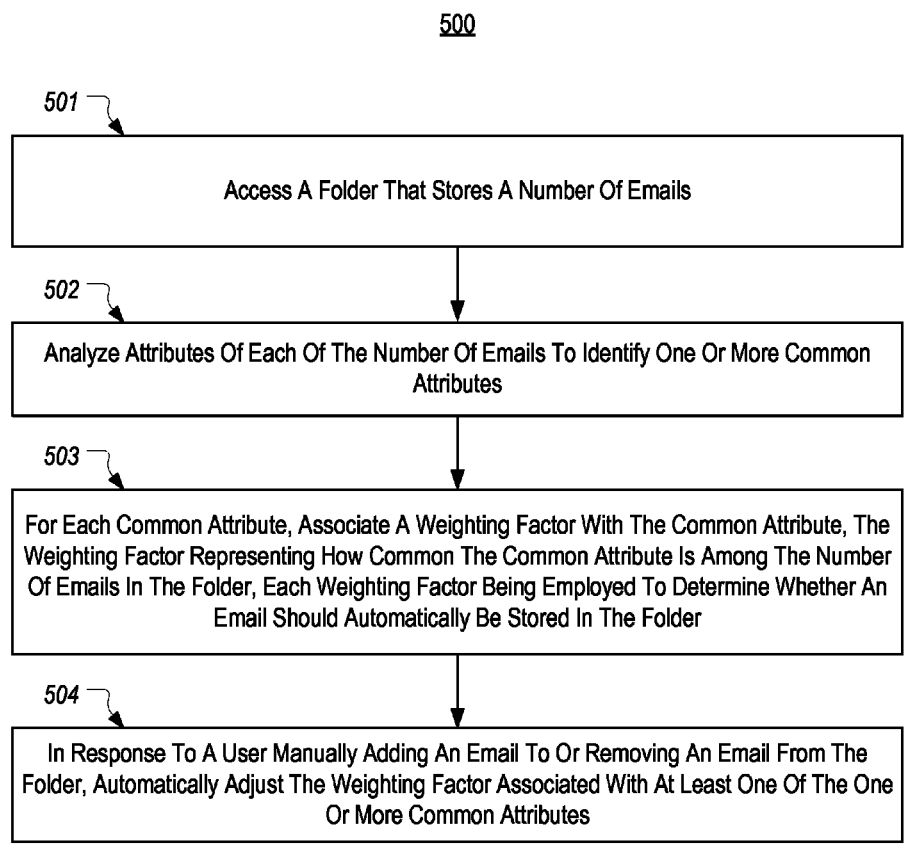
FIG. 5 illustrates a flowchart of an example method for providing a dynamic rule that is used to identify whether an email should be stored in a folder.

FIG. 5 illustrates a flowchart of an example method 500 for providing a dynamic rule that is used to identify whether an email should be stored in a folder. Method 500 will be described with frequent reference to FIGS. 1A-4.

Method 500 includes an act 501 of accessing a folder that stores a number of emails. For example, smart folder 130 which stores subset 140 can be accessed.

Method 500 includes an act 502 of analyzing attributes of each of the number of emails to identify one or more common attributes. For example, the attributes of emails in subset 140 can be analyzed to identify that the emails are commonly sent by user1@company.com, commonly include proposal in the subject, and commonly include an attachment.

Method 500 includes an act 503 of, for each common attribute, associating a weighting factor with the common attribute, the weighting factor representing how common the common attribute is among the number of emails in the folder, each weighting factor being employed to determine whether an email should automatically be stored in the folder. For example, association 152a can be created to associate a weighting factor of 0.88 to the attribute of being sent by user1@company.com, association 152b can be created to associate a weighting factor of 0.45 to the attribute of containing proposal in the subject, and association 152c can be created to associate a weighting factor of 0.3 with the attribute of including an attachment.

Method 500 includes an act 504 of, in response to a user manually adding an email to or removing an email from the folder, automatically adjusting the weighting factor associated with at least one of the one or more common attributes. For example, in response to email 300 being added to smart folder 130 or email 400 being removed from smart folder 130, the weighting factors defined in associations 152a-152c can be updated accordingly.

FIG. 6 illustrates a flowchart of an example method 600 for automatically adjusting a dynamic rule in response to a user manually adding an email to a folder or manually removing an email from the folder. Method 600 will be described with frequent reference to FIGS. 1A-4.

Method 600 includes an act 601 of maintaining a folder that stores a number of emails, the folder being associated with a dynamic rule that is employed to determine whether an email should be automatically added to the folder, the dynamic rule including a number of associations and a folder threshold, each association identifying an attribute and a weighting factor associated with the attribute. For example, smart folder 130 which stored subset 140 may be maintained and associated with dynamic rule 150. Dynamic rule 150 can include attribute and weighting factor associations 152 and folder threshold 153.

Method 600 includes an act 602 of receiving user input that manually adds a first email to the folder, and in response, updating the dynamic rule by increasing the weighting factor associated with any attribute that the first email matches and decreasing the weighting factor associated with any attribute that the first email does not match. For example, email 300 may be manually added to smart folder 130. In response, the weighting factors of associations 152a-152c can be updated accordingly.

Method 600 includes an act 603 of receiving user input that manually removes a second email from the folder, and in response, updating the dynamic rule by decreasing the weighting factor associated with any attribute that the second email matches and increasing the weighting factor associated with any attribute that the second email does not match. For example, email 400 may be manually removed from smart folder 130. In response, the weighting factors of associations 152a-152c can be updated accordingly.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media.

Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by an email system, for providing a dynamic rule that is used to identify whether an email should be stored in a folder, the method comprising:
   accessing a folder that stores a number of emails;
   analyzing attributes of each of the number of emails to identify a plurality of common attributes;
   for each common attribute, associating a weighting factor with the common attribute, the weighting factor representing how common the common attribute is among the number of emails in the folder, each weighting factor being employed to determine whether an email should automatically be stored in the folder;
   in response to a user manually adding a first email to the folder, determining that the first email matches a first attribute of the common attributes but does not match a second attribute of the common attributes; and
   automatically adjusting the weighting factor associated with the first and second attributes by increasing the weighting factor associated with the first attribute and decreasing the weighting factor associated with the second attribute.

2. The method of claim 1, further comprising:
   in response to the user manually removing a second email from the folder, determining that the second email matches the first attribute but does not match the second attribute; and
   automatically decreasing the weighting factor associated with the first attribute and automatically increasing the weighting factor associated with the second attribute.

3. The method of claim 1, further comprising:
   prior to accessing the folder, receiving user input that requests that the folder be created, the user input including a hint; and
   employing the hint to identify the number of emails to be stored in the folder.

4. The method of claim 1, further comprising:
   generating an email index for each of the number of emails, each email index being generated using the weighting factor of any common attribute that the email matches; and
   generating a folder threshold from the email indexes.

5. The method of claim 4, further comprising:
   generating an email index for an email that is not stored in the folder;
   comparing the email index for the email that is not stored in the folder to the folder threshold to determine whether the email that is not stored in the folder should be stored in the folder.

6. The method of claim 4, wherein the folder threshold has a value that is less than or equal to a lowest email index generated for the number of emails stored in the folder.

7. The method of claim 4, further comprising:
   after automatically adjusting the weighting factor associated with the first and second attributes, updating the folder threshold.

8. A method for automatically adjusting a dynamic rule in response to a user manually adding an email to a folder or manually removing an email from the folder, the method comprising:
   maintaining a folder that stores a number of emails, the folder being associated with a dynamic rule that is employed to determine whether an email should be automatically added to the folder, the dynamic rule including a plurality of associations and a folder threshold, each association identifying an attribute and a weighting factor associated with the attribute;
   receiving user input that manually adds a first email to the folder, and in response, determining that the second email matches an attribute identified in one or more of the associations but does not match an attribute identified in another one or more of the associations and updating the dynamic rule by increasing the weighting factor associated with each identified attribute that the first email is determined to match and decreasing the weighting factor associated with each identified attribute that the first email is determined to not match; and
   receiving user input that manually removes a second email from the folder, and in response, determining that the second email matches an attribute identified in one or more of the associations but does not match an attribute identified in another one or more of the associations and updating the dynamic rule by decreasing the weighting factor associated with each identified attribute that the second email is determined to match and increasing the weighting factor associated with each identified attribute that the second email is determined to not match.

9. The method of claim 8, further comprising:
determining whether to automatically move a third email into the folder by:
for each attribute of the third email that matches an attribute identified in one of the associations, identifying the weighting factor associated with the attribute;
creating an email index by combining each identified weighting factor;
comparing the email index to the folder threshold such that when the email index exceeds the folder threshold, the third email is automatically moved into the folder.

10. The method of claim 8, further comprising:
in response to updating the dynamic rule, adjusting the folder threshold by:
generating an email index, using the updated dynamic rule, for each email stored in the folder; and
setting a value of the folder threshold based on the generated email indexes.

11. The method of claim 10, wherein the value of the folder threshold is set equal to or lower than any of the generated email indexes.

12. The method of claim 8, further comprising:
in response to user input, applying the dynamic rule to emails not stored in the smart folder to identify whether any of the emails should be moved into the smart folder.

13. The method of claim 12, wherein applying the dynamic rule to emails not stored in the smart folder to identify whether any of the emails should be moved into the smart folder comprises, for each email:
identifying attributes of the email;
for each attribute of the email that matches an attribute identified in one of the associations, identifying the weighting factor associated with the attribute;
creating an email index for the email by combining each identified weighting factor;
comparing the email index of the email to the folder threshold such that when the email index exceeds the folder threshold, the email is automatically moved into the folder.

14. One or more computer storage media storing computer executable instructions which when executed by one or more processors implement a method for creating and updating a dynamic rule for a folder, the method comprising:
accessing a folder that stores a number of documents;
analyzing attributes of each of the number of documents to identify one or more common attributes;
for each common attribute, associating a weighting factor with the common attribute, the weighting factor representing how common the common attribute is among the number of documents in the folder, each weighting factor being employed to determine whether a document should automatically be stored in the folder;
receiving user input that manually adds a first document to the folder, and in response, determining that the first document matches one or more of the common attributes but does not match another one or more of the common attributes and updating the dynamic rule by increasing the weighting factor associated with each common attribute that the first document matches and decreasing the weighting factor associated with each common attribute that the first document does not match; and
receiving user input that manually removes a second document from the folder, and in response, determining that the second document matches one or more of the common attributes but does not match another one or more of the common attributes and updating the dynamic rule by decreasing the weighting factor associated with each common attribute that the second document matches and increasing the weighting factor associated with each common attribute that the second document does not match.

15. The computer storage media of claim 14, wherein the number of documents, the first document, and the second document comprise emails.

16. The computer storage media of claim 14, further comprising:
automatically adding a third document to the folder based on an index generated for the third document, the index being generated based on the weighting factors.

17. The computer storage media of claim 16, wherein the index is generated by combining the weighting factors associated with any common attributes that the third document matches.

18. The computer storage media of claim 17, wherein automatically adding a third document to the folder based on an index generated for the third document comprises automatically adding the third document when the index exceeds a folder threshold defined for the folder.

19. The computer storage media of claim 18, wherein the folder threshold is based on indexes generated for the number of documents stored in the folder.

* * * * *